US011584848B2

(12) United States Patent
Nakamura et al.

(10) Patent No.: US 11,584,848 B2
(45) Date of Patent: Feb. 21, 2023

(54) RESIN COMPOSITION, HEAT-SHRINKABLE FILM, AND CONTAINER

(71) Applicant: Denka Company Limited, Tokyo (JP)

(72) Inventors: Yuya Nakamura, Chiba (JP); Jun Yoshida, Chiba (JP)

(73) Assignee: Denka Company Limited, Tokyo (JP)

( * ) Notice: Subject to any disclaimer, the term of this patent is extended or adjusted under 35 U.S.C. 154(b) by 210 days.

(21) Appl. No.: 16/754,946

(22) PCT Filed: Oct. 10, 2018

(86) PCT No.: PCT/JP2018/037783
§ 371 (c)(1),
(2) Date: Apr. 9, 2020

(87) PCT Pub. No.: WO2019/074013
PCT Pub. Date: Apr. 18, 2019

(65) Prior Publication Data
US 2020/0239681 A1    Jul. 30, 2020

(30) Foreign Application Priority Data

Oct. 11, 2017   (JP) .............................. JP2017-197355

(51) Int. Cl.
*C08L 53/02* (2006.01)
*B29C 61/02* (2006.01)
(Continued)

(52) U.S. Cl.
CPC .............. *C08L 53/02* (2013.01); *B29C 61/02* (2013.01); *B65D 65/40* (2013.01); *C08J 5/18* (2013.01);
(Continued)

(58) Field of Classification Search
None
See application file for complete search history.

(56) References Cited

U.S. PATENT DOCUMENTS 6,841,261 B2 *  1/2005  Matsui ................... C08L 53/02
                                                        428/521
7,189,462 B2    3/2007  Matsui et al.
(Continued)

FOREIGN PATENT DOCUMENTS

JP    2003-33968 A    2/2003
JP    2006-117879 A   5/2006
(Continued)

OTHER PUBLICATIONS

International Search Report dated Jan. 15, 2019, issued in counterpart International Application No. PCT/JP2018/037783 (2 pages).

*Primary Examiner* — Tae H Yoon
(74) *Attorney, Agent, or Firm* — WHDA, LLP (57) ABSTRACT

The resin composition includes a block copolymer including a vinyl aromatic hydrocarbon-derived structural unit and a conjugated diene-derived structural unit, the resin composition satisfying the following (1) to (3): (1) an area ratio of components having a molecular weight in terms of polystyrene of equal to or more than 400,000 with respect to all components is equal to or more than 8% and equal to or less than 50%; (2) at least one main peak of a loss tangent value (tan δ) measured under a condition of a frequency of 1 Hz at a temperature rising rate of 4° C./min in accordance with ISO 6721-1 is present in a range of equal to or more than 70° C. and equal to or less than 100° C.; and (3) a strain hardening degree (λ max) of a compression-molded specimen prepared in accordance with ISO 293 is equal to or more than 2.0.

9 Claims, 1 Drawing Sheet (51) Int. Cl.
*B65D 65/40* (2006.01)
*C08J 5/18* (2006.01)
*B65D 65/02* (2006.01)

(52) U.S. Cl.
CPC ......... *B65D 65/02* (2013.01); *C08J 2353/02* (2013.01); *C08J 2453/02* (2013.01); *C08L 2203/16* (2013.01); *C08L 2205/025* (2013.01)

(56) References Cited

U.S. PATENT DOCUMENTS

| | | | |
|---|---|---|---|
| 7,279,532 B2 * | 10/2007 | Sasagawa | C08F 8/00 |
| | | | 525/383 |
| 7,893,156 B2 | 2/2011 | Hoshi et al. | |
| 2004/0102576 A1 | 5/2004 | Matsui et al. | |
| 2005/0089702 A1 | 4/2005 | Matsui et al. | |
| 2005/0222331 A1 | 10/2005 | Hoshi et al. | |
| 2007/0026175 A1 | 2/2007 | Toya et al. | |
| 2014/0213732 A1 * | 7/2014 | Stewart | C08F 8/02 |
| | | | 525/290 |
| 2015/0175758 A1 * | 6/2015 | Hoshi | C08F 8/04 |
| | | | 524/331 |

FOREIGN PATENT DOCUMENTS

| | | |
|---|---|---|
| JP | 2007-160544 A | 6/2007 |
| JP | 2009-275147 A | 11/2009 |
| JP | 2009-275149 A | 11/2009 |
| JP | 2009-275151 A | 11/2009 |
| JP | 2013-199616 A | 10/2013 |
| WO | 02/38642 A1 | 5/2002 |
| WO | 03/091303 A1 | 11/2003 |
| WO | 2005/005527 A1 | 1/2005 |

\* cited by examiner

RESIN COMPOSITION, HEAT-SHRINKABLE FILM, AND CONTAINER

TECHNICAL FIELD

The present invention relates to a resin composition, a heat-shrinkable film, and a container.

BACKGROUND ART

A heat-shrinkable film using a block copolymer including a vinyl aromatic hydrocarbon and a conjugated diene has excellent heat shrinkability and finish after shrinkage and can correspond to various shapes of objects to be packaged and mounting methods, and thus, has been widely used for shrink packaging. Further, it is also advantageous that there is no environmental pollution problem, such as polyvinyl chloride, at the time of disposal. However, the heat-shrinkable film using a block copolymer naturally shrinks during storage to cause misprints or mounting failure, and thus, it is a challenge to improve natural shrink resistance. Further, the heat-shrinkable film requires heat shrinkability and break resistance in addition to the natural shrink resistance, and improvement in such physical properties is desired.

As a method of improving natural shrink resistance, for example, a method of controlling temperature dependency of a loss tangent value (tan δ) by dynamic viscoelasticity measurement is described in Patent Document 1, and a method of blending a block copolymer including a vinyl aromatic hydrocarbon and a conjugated diene with a styrene-(meth)acrylate copolymer is described in Patent Document 2. Patent Document 3 discloses a method of laminating a polyester resin having excellent natural shrink resistance on a surface layer, and Patent Document 4 discloses that a heat-shrinkable film having excellent natural shrink resistance can be obtained by a method of hydrogenating a block copolymer including a vinyl aromatic hydrocarbon and a conjugated diene.

RELATED DOCUMENTS

Patent Documents

Patent Document 1: International Publication No. WO 2002/038642
Patent Document 2: Japanese Patent Application Publication No. 2003-33968
Patent Document 3: Japanese Patent Application Publication No. 2007-160544
Patent Document 4: Japanese Patent Application Publication No. 2006-117879

SUMMARY OF THE INVENTION

Technical Problem

However, it cannot be said that natural shrink resistance is sufficient with the methods described in Patent Documents 1 and 2, and further improvement in the natural shrink resistance has been desired. In addition, an increased production cost is a challenge, in that an expensive elastomer is used as an adhesive layer when lamination in the method described in Patent Document 3, and a hydrogenation process is required in the method described in Patent Document 4. Further, in the conventional method, there is room for improvement from the viewpoint of achieving physical properties such as heat shrinkability and break resistance as well as natural shrink resistance in a well-balanced manner.

In light of the above-described situation, the present invention provides a technique relating to a resin composition which achieves excellent natural shrink resistance, heat shrinkability, and break resistance in a well-balanced manner, when forming a film.

Solution to Problem

According to the present invention, there is provided a resin composition including a block copolymer including a vinyl aromatic hydrocarbon-derived structural unit and a conjugated diene-derived structural unit, the resin composition satisfying the following (1) to (3):

(1) an area ratio of components having a molecular weight in terms of polystyrene of equal to or more than 400,000 with respect to all components, in a GPC measurement, is equal to or more than 8% and equal to or less than 50%;

(2) at least one main peak of a loss tangent value (tan δ) measured under a condition of a frequency of 1 Hz at a temperature rising rate of 4° C./min in accordance with ISO 6721-1, in a dynamic viscoelasticity measurement, is present in a range of equal to or more than 70° C. and equal to or less than 100° C.; and (3) a strain hardening degree (λ max) of a compression-molded specimen prepared in accordance with ISO 293, measured under a condition of a temperature of 100° C. at a strain rate of 0.1 sec$^{-1}$, in an extensional viscosity measurement, is equal to or more than 2.0.

Further, according to the present invention, there is provided a heat-shrinkable film including at least one layer of the resin composition described above.

Further, according to the present invention, there is provided a heat-shrinkable film including a block copolymer including a vinyl aromatic hydrocarbon-derived structural unit and a conjugated diene-derived structural unit as a main component, the heat-shrinkable film satisfying the following (a) to (c):

(a) at least one main peak of a loss tangent value (tan δ) of a specimen immersed in hot water at 100° C. for 3 minutes, measured in a direction perpendicular to a stretching direction under a condition of a frequency of 1 Hz at a temperature rising rate of 4° C./min in accordance with ISO 6721-1, in a dynamic viscoelasticity measurement, is present in a range of equal to or more than 70° C. and equal to or less than 100° C.;

(b) a strain hardening degree (λ max) of a specimen immersed in hot water at 100° C. for 3 minutes, measured in a direction perpendicular to a stretching direction under a condition of a temperature of 100° C. at a strain rate of 0.1 sec$^{-1}$, in an extensional viscosity measurement, is equal to or more than 2.0; and (c) a maximum value of a shrinkage stress measured at 80° C. is equal to or more than 0.8 MPa and equal to or less than 2.2 MPa.

Further, according to the present invention, there is provided a container with the heat-shrinkable film described above mounted thereon.

Advantageous Effects of Invention

According to the present invention, there is provided a resin composition which achieves excellent natural shrink resistance, heat shrinkability, and break resistance in a well-balanced manner, when forming a film.

BRIEF DESCRIPTION OF THE DRAWINGS

The above and other objects, features, and advantages will become more apparent from the preferred embodiments described later and the following accompanying drawings.

DESCRIPTION OF EMBODIMENTS

Hereinafter, embodiments of the present invention will be described in detail.

Resin Composition

A resin composition according to an embodiment includes a block copolymer including a vinyl aromatic hydrocarbon-derived structural unit and a conjugated diene-derived structural unit, and satisfies the following (1) to (3):

(1) an area ratio of components having a molecular weight in terms of polystyrene of equal to or more than 400,000 with respect to all components, in a GPC measurement, is equal to or more than 8% and equal to or less than 50%;

(2) at least one main peak of a loss tangent value (tan $\delta$) measured under a condition of a frequency of 1 Hz at a temperature rising rate of 4° C./min in accordance with ISO 6721-1, in a dynamic viscoelasticity measurement, is present in a range of equal to or more than 70° C. and equal to or less than 100° C.; and (3) a strain hardening degree ($\lambda$ max) of a compression-molded specimen prepared in accordance with ISO 293, measured under a condition of a temperature of 100° C. at a strain rate of 0.1 sec$^{-1}$, in an extensional viscosity measurement, is equal to or more than 2.0.

In addition, more detailed conditions of dynamic viscoelasticity measurement and extensional viscosity measurement are as follows.

Dynamic Viscoelasticity Measurement Conditions (a) A molded article having a thickness of 4 mm and a width of 10 mm is prepared by injection molding using the resin composition, and a specimen is cut out from the molded article and stored in a room at 23° C. and 50% RH for 48 hours to perform a curing treatment.

(b) A dynamic viscoelasticity measuring device is used to measure a storage modulus (E') and a loss modulus (E") in a temperature range from room temperature to 120° C. at a temperature rising rate of 4° C./min and a measurement frequency of 1 Hz, and a loss tangent value (tan $\delta$) is calculated by the following equation.

$$\tan \delta = E''/E'$$

Extensional Viscosity Measurement Conditions (a) After a pellet of the resin composition is molded to have a thickness of 0.6 mm by press molding, a specimen having a width of 10 mm is cut out and stored under an environment at 60° C. for 48 hours to perform a curing treatment.

(b) An extensional viscosity measuring device is used to measure an extensional viscosity ($\eta$) at a temperature of 100° C. at a strain rate of 0.1 sec$^{-1}$.

Figure 1:
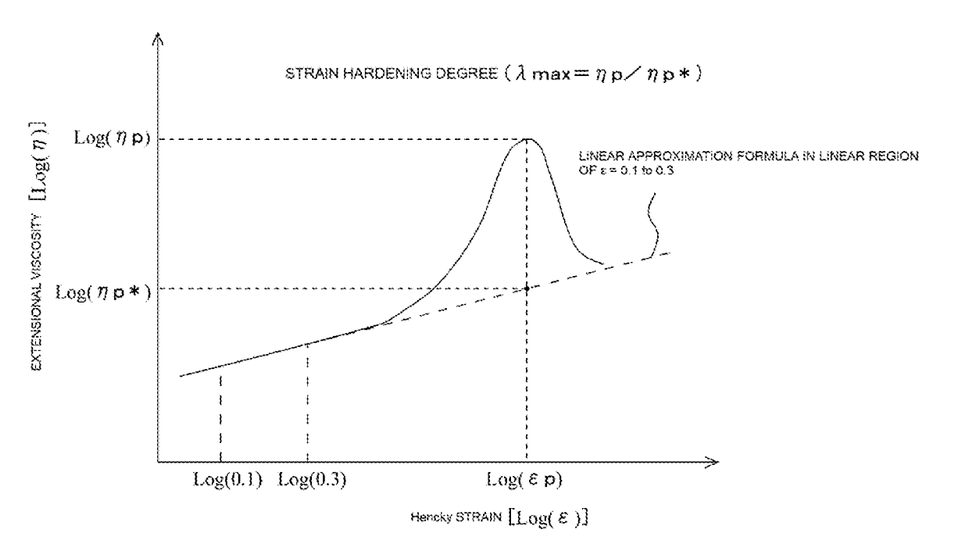
FIG. 1 is an example of a graph used to calculate a strain hardening degree.

(c) A graph with a common logarithm Log ($\varepsilon$) of a Hencky strain ($\varepsilon$) on the horizontal axis and a common logarithm Log ($\eta$) of $\eta$ on the vertical axis is created and a linear approximation formula in a linear region in which $\varepsilon$=equal to or more than 0.1 and equal to or less than 0.3 is determined. FIG. 1 illustrates an example of a graph used to calculate a strain hardening degree.

(d) When the Hencky strain at a point where $\eta$ shows a peak is $\varepsilon p$, a measured value of the extensional viscosity at $\varepsilon = \varepsilon p$ is $\eta p$, and a calculated value at $\varepsilon = \varepsilon p$ of the above linear approximation formula is $\eta p^*$, a strain hardening degree ($\lambda$ max) is calculated by the following equation.

$$\lambda \max = \eta p / \eta p^*$$

In the resin composition according to the present embodiment, a lower limit of an area ratio of components having a molecular weight in terms of polystyrene of equal to or more than 400,000 with respect to all components, in a GPC measurement, is equal to or more than 8%, preferably equal to or more than 10%, and more preferably equal to or more than 12%. An upper limit of the area ratio is equal to or less than 50%, preferably equal to or less than 45%, and more preferably equal to or less than 40%. When the area ratio is equal to or more than 8%, a balance between natural shrink resistance and a heat shrinkage rate, and break resistance can be improved, at the time of being formed into a heat-shrinkable film. On the other hand, when the area ratio is equal to or less than 50%, moldability at the time of molding the heat-shrinkable film can be improved.

In the resin composition of the present embodiment, a balance of the following three parameters is optimized: the area ratio of components having a molecular weight in terms of polystyrene of equal to or more than 400,000 with respect to all components being equal to or more than 8% and equal to or less than 50%, at least one main peak of the loss tangent value (tan $\delta$) being present in the temperature range of equal to or more than 70° C. and equal to or less than 100° C., and a strain hardening degree ($\lambda$ max=$\eta p/\eta p^*$) obtained from the extensional viscosity measurement under the extensional viscosity measurement conditions being equal to or more than 2.0, thereby achieving excellent natural shrink resistance, heat shrinkability, and break resistance in a well-balanced manner, when the resin composition is formed into a heat-shrinkable film.

The resin composition according to the present embodiment has a block copolymer including a vinyl aromatic hydrocarbon-derived structural unit and a conjugated diene-derived structural unit. One type of block copolymer may be used, and two or more types of block copolymers may be mixed in an arbitrary blending ratio and used. When a mixture of a plurality of block copolymers is used, it is preferred that predetermined amounts of components are mixed, and then melt-kneaded by an extruder.

In the resin composition of the present embodiment, when a sum of a content of the vinyl aromatic hydrocarbon-derived structural unit and a content of the conjugated diene-derived structural unit is 100% by mass, it is preferred that a content ratio of the vinyl aromatic hydrocarbon-derived structural unit is equal to or more than 70% by mass and equal to or less than 84% by mass and a content ratio of the conjugated diene-derived structural unit is equal to or more than 16% by mass and equal to or less than 30% by mass. It is more preferred that the content ratio of the vinyl aromatic hydrocarbon-derived structural unit is equal to or more than 73% by mass and equal to or less than 81% by mass, and the content ratio of the conjugated diene-derived structural unit is equal to or more than 19% by mass and equal to or less than 27% by mass. When the content ratio of the conjugated diene-derived structural unit is equal to or more than 16% by mass, the break resistance of the obtained heat-shrinkable film is further improved, and when the content ratio of the conjugated diene-derived structural unit is equal to or less than 30% by mass, it is possible to suppress a natural shrinkage rate of the obtained heat-shrinkable film from being too high.

Examples of the vinyl aromatic hydrocarbon include styrene, o-methylstyrene, p-methylstyrene, p-tert-butylstyrene, 1,3-dimethylstyrene, α-methylstyrene, vinylnaphthalene, vinylanthracene, and the like. The vinyl aromatic hydrocarbon may be used alone or in combination of two or more among the above. Particularly preferred as the vinyl aromatic hydrocarbon is styrene.

Examples of the conjugated diene include 1,3-butadiene, 2-methyl-1,3-butadiene (isoprene), 2,3-dimethyl-1,3-butadiene, 1,3-pentadiene, 1,3-hexadiene, and the like. The conjugated diene may be used alone or in combination of two or more among the above. Particularly preferred as the conjugated diene is at least one type of 1,3-butadiene and isoprene.

The block copolymer included in the resin composition of the present embodiment can be obtained by a living anionic polymerization reaction using an organic lithium compound in an organic solvent as a polymerization initiator, or the living anionic polymerization reaction followed by a coupling reaction using polyfunctional coupling agent. The organic solvent used in the reaction is a low-molecular organic compound consisting of carbon and hydrogen, and known organic solvents, for example, aliphatic hydrocarbons such as butane, pentane, hexane, isopentane, heptane, octane, and isooctane; alicyclic hydrocarbons such as cyclopentane, methylcyclopentane, cyclohexane, methylcyclohexane, and ethylcyclohexane; aromatic hydrocarbons such as benzene, toluene, ethylbenzene, and xylene; and the like, may be used.

The organic lithium compound is a compound in which one or more lithium atoms are bonded in a molecule, and for example, ethyl lithium, n-propyl lithium, isopropyl lithium, n-butyl lithium, sec-butyl lithium, tert-butyl lithium, and the like.

In production of the block copolymer used in the present embodiment, a small amount of a polar compound may be dissolved in the solvent. The polar compound is used to improve efficiency of an initiator. Examples of the polar compound include ethers such as tetrahydrofuran, diethylene glycol dimethyl ether, and diethylene glycol dibutyl ether; amines such as triethylamine and tetramethylethylenediamine; thioethers; phosphines; phosphoramides; alkylbenzene sulfonates; alkoxides of potassium and sodium; and the like. A particularly preferred polar compound is tetrahydrofuran.

A polymerization temperature for producing the block copolymer used in the present embodiment is generally equal to or more than −10° C. and equal to or less than 150° C., and preferably equal to or more than 40° C. and equal to or less than 120° C. A time required for the polymerization varies with conditions, but is usually within 48 hours, and preferably equal to or more than 0.5 hours and equal to or less than 10 hours. It is desirable that the inside of a polymerization apparatus is replaced with inert gas such as nitrogen gas in advance. A polymerization pressure is not particularly limited as long as it is in a pressure range sufficient to maintain a monomer and a solvent in a liquid phase in the polymerization temperature range described above. Furthermore, it is necessary to pay attention so that impurities which deactivate the living polymer, for example, water, oxygen, carbon dioxide, and the like are not incorporated into the inside of the polymerization apparatus.

The block copolymer included in the resin composition of the present embodiment may undergo a living anionic polymerization reaction, and then a coupling reaction by adding a polyfunctional coupling agent. Examples of the polyfunctional coupling agent include chlorosilane compounds such as dimethyldichlorosilane, silicon tetrachloride, 1,2-bis(methyldichlorosilyl) ethane, methyltrichlorosilane, and tetrachlorosilane; alkoxysilane-based compounds such as dimethyldimethoxysilane, tetramethoxysilane, tetraphenoxysilane, methyltrimethoxysilane, and tetraphenoxysilane; tin tetrachloride; polyhalogenated hydrocarbons; carboxylic acid esters; polyvinyl compounds; epoxidized oils such as epoxidized soybean oil and epoxidized linseed oil; and the like. Two or more coupling agents may be used in combination. A particularly preferred polyfunctional coupling agent is epoxidized soybean oil.

The block copolymer used in the present embodiment can be obtained by, after finishing the polymerization and coupling reactions, adding for example, water, alcohol, carbon dioxide, an organic acid, an inorganic acid, and the like in an amount sufficient to deactivate a living active terminal so that the living active terminal is inactive, and removing the solvent by a degassing extrusion method.

The resin composition of the present embodiment may have at least one main peak of the loss tangent value (tan δ) in the temperature range of equal to or more than 70° C. and equal to or less than 100° C., and preferably at least one main peak in the temperature range of equal to or more than 80° C. and equal to or less than 95° C., in the dynamic viscoelasticity measurement. Here, the main peak is the temperature of the peak when there is one peak, and is the temperature of the peak having the highest loss tangent value when there are two or more peaks. When the temperature at which the main peak of tan δ is shown is equal to or more than 70° C., it is possible to suppress the natural shrinkage rate of the obtained heat-shrinkable film from being too high, and when the temperature at which the main peak of tan δ is shown is equal to or less than 100° C., the heat shrinkage rate of the obtained heat-shrinkable film can be sufficiently increased.

The resin composition of the present embodiment has a strain hardening degree (λ max) of equal to or more than 2.0, and more preferably equal to or more than 2.5, in the extensional viscosity measurement described above. λ max is used as an indicator of a strain hardening, and when λ max is equal to or more than 2.0, a thickness of the obtained heat-shrinkable film can be uniform, and the heat shrinkage rate can be sufficiently increased. An upper limit of λ max is not particularly limited, but there is no practical problem if λ max is equal to or less than 10.0.

The resin composition of the present embodiment may include various additives as necessary. Examples of the additive include stabilizers, lubricants, processing aids, antiblocking agents, antistatic agents, antifog agents, weather resistance improvers, softeners, plasticizers, pigments, and the like. These additives may be added when the block copolymer described above is melt-kneaded to produce the resin composition.

Examples of the stabilizer include phenolic antioxidants such as 2-[1-(2-hydroxy-3,5-di-tert-pentylphenyl)ethyl]-4,6-di-tert-pentylphenylacrylate, 2-tert-butyl-6-(3-tert-butyl-2-hydroxy-5-methylbenzyl)-4-methylphenylacrylate, octadecyl-3-(3,5-di-tert-butyl-4-hydroxyphenyl)propionate, and 2,6-di-tert-butyl-4-methylphenol, phosphorus-based antioxidants such as 2,2-methylenebis(4,6-di-tert-butylphenyl)

octyl phosphite, trisnonylphenyl phosphite, bis(2,6-di-tert-butyl-4-methylphenyl)pentaerythritol-di-phosphite, and the like.

Examples of the lubricant include saturated fatty acids such as palmitic acid, stearic acid, and behenic acid; fatty acid esters such as octyl palmitate, octyl stearate, and pentaerythritol fatty acid; fatty acid amides such as erucic acid amide, oleic acid amide, stearic acid amide, and ethylene bisstearic acid amide; higher alcohols such as myristyl alcohol, cetyl alcohol, and stearyl alcohol; and the like.

As the processing aid, for example, a liquid paraffin is generally used, and also, organic acid esters such as adipic acid ester, and the like can be used.

As the antiblocking agent, for example, organic fillers such as high impact polystyrene (HIPS) and crosslinked beads of a vinyl aromatic hydrocarbon copolymer; silica beads, quartz beads; and the like, can be used.

As the antistatic agent, for example, surfactants such as nonionic surfactants, anionic surfactants, cationic surfactants, and amphoteric ion surfactants can be mainly used.

As the antifog agent, for example, glycerin fatty acid esters such as glycerin-mono-fatty acid ester and glycerin-di-fatty acid ester; sorbitan fatty acid esters such as sorbitan-mono-palmitate and sorbitan-mono-stearate; and the like can be used.

As the weather resistance improver, for example, ultraviolet absorbing agents such as 2-(2'-hydroxy-3'-tert-butyl-5'-methylphenyl)-5-chlorobenzotriazole, 2,4-di-tert-butylphenyl-3',5'-di-tert-butyl-4'-hydroxybenzoate, and 2-hydroxy-4-n-octoxybenzophenone, and hindered amine type amine type weather resistance improvers such as tetrakis(2,2,6,6-tetramethyl-4-piperidyl)-1,2,3,4-butanetetracarboxylate can be used.

The additives described above are desirably used in a range of more than 0 parts by mass and equal to or less than 5 parts by mass, with respect to 100 parts by mass of the block copolymer described above. When the blending amount of the additive is equal to or less than 5 parts by mass, an appearance can be suppressed from being impaired due to the additive emerging on a surface of the obtained heat-shrinkable film.

A melt mass flow rate of the resin composition of the present embodiment is not particularly limited, but it is desirable that the melt mass flow rate is equal to or more than 2 g/10 min and equal to or less than 30 g/10 min, preferably equal to or more than 5 g/10 min and equal to or less than 20 g/10 min, and more preferably equal to or more than 5 g/10 min and equal to or less than 15 g/10 min, from the viewpoint of molding processing. The measurement is performed under a test condition of 200° C. and a loading of 49 N, in accordance with ISO 1133.

It is possible to control tan δ and the strain hardening degree of the resin composition of the present embodiment, for example, by appropriately selecting the type and the blending amount of each component included in the resin composition, a method of producing the resin composition, and the like. For example, tan δ can be controlled by adjusting the composition of the block mainly having the vinyl aromatic hydrocarbon-derived structural unit in the block copolymer included in the resin composition. The strain hardening degree can be controlled by adjusting a polymerization degree in the polymerization reaction, the amount of the coupling agent added at the time of the coupling reaction, and a blending ratio of a coupled block copolymer and an uncoupled block copolymer.

Heat-Shrinkable Film

Aspect 1 of Heat-Shrinkable Film

Aspect 1 of the heat-shrinkable film includes at least one layer of the resin composition described above. The heat-shrinkable film of the present embodiment is prepared with the resin composition described above, thereby achieving excellent natural shrink resistance, heat shrinkability, and break resistance in a well-balanced manner. More specifically, the heat-shrinkable film of the present embodiment can be obtained by forming the resin composition described above into a film by known melt extrusion molding, calender molding, or inflation molding, and stretching the film in a uniaxial or biaxial direction. The stretching direction is not particularly limited, but it is preferred that a stretching ratio is the highest in a direction (TD) perpendicular to a flow direction (MD), and hereinafter, description will be provided assuming that TD is the stretching direction.

As the heat-shrinkable film of the present aspect, a layer including the resin composition described above can be used alone, or another resin layer can be laminated on at least one surface thereof to form a heat-shrinkable multilayer film. In order to obtain the heat-shrinkable multilayer film, another resin layer may be laminated on the heat-shrinkable film after stretching, another resin layer may be laminated on an unstretched film obtained by forming the resin composition into a film and be stretched, or a multilayer film obtained by laminating the resin composition and another resin by multilayer extrusion molding may be stretched. As a resin used in another resin layer, a styrene-based resin is preferred.

It is preferred that the heat-shrinkable film or the heat-shrinkable multilayer film of the present aspect is stretched in a temperature range of a temperature at which the loss modulus (E") in the dynamic viscoelasticity measurement shows a main peak+equal to or more than 18° C. and equal to or less than 30° C. Here, the main peak is the temperature of the peak when there is one peak, and is the temperature of the peak having the highest loss modulus value when there are two or more peaks.

When the stretching temperature is a temperature at which E" shows the main peak+equal to or more than 18° C., it is possible to suppress the natural shrinkage rate of the obtained heat-shrinkable film from being high, and conversely, when the stretching temperature is a temperature at which E" shows the main peak+equal to or less than 30° C., a variation of the thickness of the obtained heat-shrinkable film is suppressed, and the heat shrinkage rate can be increased.

It is preferred that the heat-shrinkable film or the heat-shrinkable multilayer film of the present aspect is stretched at a stretching ratio of equal to or more than 3 times and equal to or less than 8 times in a stretching direction in the temperature range described above. When the stretching ratio is equal to or more than 3 times, the heat shrinkage rate of the obtained heat-shrinkable film can be increased, and conversely, when the stretching ratio is equal to or less than 8 times, it is possible to suppress the natural shrinkage rate of the obtained heat-shrinkable film from being high, and also breakage of the film at the time of stretching can be suppressed.

It is preferred that the heat-shrinkable film or the heat-shrinkable multilayer film of the present aspect has a heat shrinkage rate in the stretching direction of equal to or more than 5% after the film is immersed in hot water at 70° C. for 10 seconds, and a heat shrinkage rate in the stretching direction of equal to or more than 65% after the film is immersed in hot water at 100° C. for 10 seconds. When the heat shrinkage rate is within the range, it is possible to suppress occurrence of mounting failure by the shape of an object to be packaged, which is thus practically preferred. A method of measuring the heat shrinkage rate will be described later.

The heat-shrinkable film or the heat-shrinkable multilayer film of the present aspect has a tensile elongation in a direction perpendicular to the stretching direction of preferably equal to or more than 200% and equal to or less than 600%, and more preferably equal to or more than 300% and equal to or less than 500%. When the tensile elongation is equal to or more than 200%, for example, it is possible to suppress occurrence of film breakage or the like by an ink solvent at the time of printing. On the other hand, when the tensile elongation is equal to or less than 600%, in a state in which the perforated heat-shrinkable film is mounted on the container, perforation cutting properties can be improved at the time of peeling off the heat-shrinkable film by cutting the perforation. The tensile elongation is an indicator representing that the larger the value, the better the break resistance. A method of measuring the tensile elongation will be described later.

It is preferred that the heat-shrinkable film or the heat-shrinkable multilayer film of the present aspect has a natural shrinkage rate in the stretching direction of equal to or less than 2% as a value when stored at 40° C. for 7 days. When the natural shrinkage rate is within the range, for example, in the case in which the film is stored in a high temperature environment without temperature control, it is possible to suppress poor appearance such as waving of the film from easily occurring, which is thus practically preferred. A method of measuring the natural shrinkage rate will be described later.

It is preferred that the heat-shrinkable film or the heat-shrinkable multilayer film of the present aspect has a maximum value of a shrinkage stress in the stretching direction occurring at the time of shrinkage at 80° C., of equal to or more than 0.8 MPa and equal to or less than 2.2 MPa. When the shrinkage stress is equal to or more than 0.8 MPa, the heat shrinkage rate can be increased, and conversely, when the shrinkage stress is equal to or less than 2.2 MPa, the natural shrinkage rate can be suppressed from being increased.

The thickness of the heat-shrinkable film or the heat-shrinkable multilayer film of the present aspect is not particularly limited, but is preferably equal to or more than 15 μm and equal to or less than 100 μm.

Aspect 2 of Heat-Shrinkable Film

Further, Aspect 2 of the heat-shrinkable film includes a block copolymer including a vinyl aromatic hydrocarbon-derived structural unit and a conjugated diene-derived structural unit as a main component, and satisfies the following (a) to (c):

(a) at least one main peak of a loss tangent value (tan δ) of a specimen immersed in hot water at 100° C. for 3 minutes, measured in a direction perpendicular to a stretching direction under a condition of a frequency of 1 Hz at a temperature rising rate of 4° C./min in accordance with ISO 6721-1, in a dynamic viscoelasticity measurement, is present in a range of equal to or more than 70° C. and equal to or less than 100° C.;

(b) a strain hardening degree (λ max) of a specimen immersed in hot water at 100° C. for 3 minutes, measured in a direction perpendicular to a stretching direction under a condition of a temperature of 100° C. at a strain rate of 0.1 sec$^{-1}$, in an extensional viscosity measurement, is equal to or more than 2.0; and An upper limit of λ max in the heat-shrinkable film is not particularly limited, but there is no practical problem if λ max is equal to or less than 10.0.

(c) a maximum value of a shrinkage stress measured at 80° C. is equal to or more than 0.8 MPa and equal to or less than 2.2 MPa.

In the present aspect, it is preferred that the heat-shrinkable film has the following properties as in the Aspect 1 of the heat-shrinkable film.

The natural shrinkage rate is equal to or less than 2% at 40° C. for 7 days.

The heat shrinkage rate is equal to or more than 5% at 70° C. for 10 seconds and equal to or more than 65% at 100° C. for 10 seconds.

The tensile elongation in the direction perpendicular to the stretching direction is equal to or more than 200% and equal to or less than 600%.

The heat-shrinkable film of the present aspect exhibits excellent natural shrinkage resistance, heat shrinkability, and breakage resistance in a well-balanced manner.

Use

The heat-shrinkable film or the heat-shrinkable multilayer film of the present embodiment can be mounted on a bottle (container) by placing the film as a label printed with designs, letters, trademarks, and the like by a known method over the bottle and heat-shrinking the label by a known method. The heating method may be steam heating or hot air heating, and it is preferred that a heating temperature is adjusted so that a label surface is equal to or more than 70° C. and equal to or less than 90° C.

The heat-shrinkable film or the heat-shrinkable multilayer film of the present embodiment can be appropriately used for a heat-shrinkable cap seal for a bottle, a protective film for a bottle, and other packaging films, in addition to the heat-shrinkable label for a bottle.

Though the embodiments of the present invention have been described above, these are examples of the present invention and various configurations other than the above can be adopted. For example, the present invention includes the aspects represented by the following items.

[Item 1] A heat-shrinkable film including a resin satisfying the following (1) to (4), wherein a maximum value of a shrinkage stress at 80° C. is equal to or more than 0.8 MPa and equal to or less than 2.2 MPa:

(1) a sum of a vinyl aromatic hydrocarbon monomer unit and a conjugated diene monomer unit is 100% by mass, and the vinyl aromatic hydrocarbon monomer unit is included at equal to or more than 70% by mass and equal to or less than 84% by mass and the conjugated diene monomer unit is included at equal to or more than 16% by mass and equal to or less than 30% by mass;

(2) in 100% by mass of the resin, a compound coupled by a polyfunctional coupling agent is included at equal to or more than 10% by mass;

(3) at least one main peak of a loss tangent value (tan δ) obtained by a dynamic viscoelasticity measurement is present in a range of equal to or more than 70° C. and equal to or less than 100° C.; and (4) a strain hardening degree (λ max) in an extensional viscosity measurement is equal to or more than 2.0.

[Item 2] The heat-shrinkable film according to Item 1, wherein a natural shrinkage rate is equal to or less than 2% at 40° C. for 7 days.

[Item 3] The heat-shrinkable film according to Item 1 or 2, wherein a heat shrinkage rate is equal to or more than 5% at 70° C. for 10 seconds and equal to or more than 65% at 100° C. for 10 seconds.

[Item 4] The heat-shrinkable film according to any one of Items 1 to 3, wherein a tensile elongation in a direction perpendicular to a stretching direction is equal to or more than 200%.

[Item 5] A method of producing the heat-shrinkable film according to any one of Items 1 to 4, the method including: stretching an unstretched film obtained by forming the resin into a film equal to or more than 3 times and equal to or less than 8 times in a temperature range of a temperature at which a loss modulus (E") obtained by a dynamic viscoelasticity measurement shows a main peak+equal to or more than 18° C. and equal to or less than 30° C.

[Item 6] A heat-shrinkable multilayer film obtained by laminating another resin layer is laminated on at least one surface of the heat-shrinkable film according to any one of Items 1 to 4, wherein a maximum value of a shrinkage stress in a stretching direction at 80° C. is equal to or more than 0.8 MPa and equal to or less than 2.2 MPa.

[Item 7] A method of producing the heat-shrinkable multilayer film according to Item 6, the method including: stretching a laminate obtained by laminating another resin layer on at least one surface of an unstretched film obtained by forming the resin into a film equal to or more than 3 times and equal to or less than 8 times in a temperature range of a temperature at which a loss modulus (E") obtained by a dynamic viscoelasticity measurement of the resin shows a main peak equal to or more than 18° C. and equal to or less than 30° C.

[Item 8] A container with the heat-shrinkable film according to any one of Items 1 to 4 mounted thereon.

[Item 9] A container with the heat-shrinkable multilayer film according to Item 6 mounted thereon.

EXAMPLES

Hereinafter, the present invention will be described in more detail with reference to Examples, but the present invention is not limited to the Examples.

Production of Block Copolymer

Block copolymers (A-1) and (A-2) including a coupling reaction using a polyfunctional coupling agent and block copolymers (B-1) to (B-5) including no coupling reaction were produced by the following operations.

Block Copolymer (A-1)

(1) 500.0 kg of cyclohexane and 75.0 g of tetrahydrofuran (THF) were placed in a reaction vessel.

(2) 2000 mL of a cyclohexane solution of 10% by mass of n-butyllithium as a polymerization initiator solution was added to the reaction vessel, and maintained at 30° C.

(3) 4 kg of styrene was added to anionically polymerize styrene. The internal temperature rose to 35° C.

(4) After styrene was completely consumed, the internal temperature of the reaction system was raised to 80° C., and while maintaining the internal temperature, a total amount of 144 kg of styrene and a total amount of 12 kg of 1,3-butadiene were added at the same time at constant addition rates of 144 kg/h and 12 kg/h, respectively.

(5) After styrene and 1,3-butadiene were completely consumed, the internal temperature of the reaction system was lowered to 60° C., and 36 kg of 1,3-butadiene was added at once to anionically polymerize 1,3-butadiene. The internal temperature rose to 86° C.

(6) After 1,3-butadiene was completely consumed, the internal temperature of the reaction system was lowered to 70° C., and 4 kg of styrene was added to anionically polymerize styrene. The internal temperature rose to 73° C.

(7) After styrene was completely consumed, the internal temperature of the reaction system was raised to 75° C., and 190 g of epoxidized soybean oil diluted with 2 kg of cyclohexane was added as a polyfunctional coupling agent to complete the polymerization.

(8) Finally, all polymerization active terminals were deactivated with water to obtain a polymerization solution including a block copolymer having a polystyrene block, a polybutadiene block, and a random block of styrene and butadiene.

(9) The polymerization solution was devolatilized and melt-pelletized with an extruder to obtain a block copolymer (A-1). An area ratio of the component having a molecular weight in terms of polystyrene of equal to or more than 400,000 with respect to all components was 30%, as determined from the following GPC measurement.

GPC Measurement

A GPC measurement was performed with the following GPC measuring device and conditions.

Device name: HLC-8220GPC (manufactured by TOSOH CORPORATION)

Column: Four Shodex GPC KF-404 (manufactured by SHONA DENKO K.K.) were connected in series.

Temperature: 40° C.

Detection: differential refractive index

Solvent: tetrahydrofuran

Concentration: 2% by mass

Calibration curve: prepared using standard polystyrene (manufactured by VARIAN).

Block Copolymer (A-2)

(1) 500.0 kg of cyclohexane and 75.0 g of tetrahydrofuran (THF) were placed in a reaction vessel.

(2) 2000 mL of a cyclohexane solution of 10% by mass of n-butyllithium as a polymerization initiator solution was added to the reaction vessel, and maintained at 30° C.

(3) 70 kg of styrene was added to anionically polymerize styrene. The internal temperature rose to 70° C.

(4) After styrene was completely consumed, the internal temperature of the reaction system was lowered to 60° C., and 10 kg of styrene and 30 kg of 1,3-butadiene were added at once at the same time. The internal temperature rose to 78° C.

(5) After styrene and 1,3-butadiene were completely consumed, the internal temperature of the reaction system was lowered to 50° C., and 90 kg of styrene was added to anionically polymerize styrene. The internal temperature rose to 93° C.

(6) After styrene was completely consumed, the internal temperature of the reaction system was raised to 75° C., and 64 g of silicon tetrachloride diluted with 2 kg of cyclohexane was added as a polyfunctional coupling agent to complete the polymerization.

(6) Finally, all polymerization active terminals were deactivated with water to obtain a polymerization solution including a block copolymer having a polystyrene block, a polybutadiene block, and a random block of styrene and butadiene.

(8) The polymerization solution was devolatilized and melt-pelletized with an extruder to obtain a block copolymer (A-2). An area ratio of the component having a molecular weight in terms of polystyrene of equal to or more than 400,000 with respect to all components was 56%, as determined from the GPC measurement.

Block Copolymer (B-1)

(1) 500.0 kg of cyclohexane and 75.0 g of tetrahydrofuran (THF) were placed in a reaction vessel.

(2) 2000 mL of a cyclohexane solution of 10% by mass of n-butyllithium as a polymerization initiator solution was added to the reaction vessel, and maintained at 30° C.

(3) 4 kg of styrene was added to anionically polymerize styrene. The internal temperature rose to 35° C.

(4) After styrene was completely consumed, the internal temperature of the reaction system was raised to 80° C., and while maintaining the internal temperature, a total amount of 144 kg of styrene and a total amount of 12 kg of 1,3-butadiene were added at the same time at constant addition rates of 144 kg/h and 12 kg/h, respectively.

(5) After styrene and 1,3-butadiene were completely consumed, the internal temperature of the reaction system was lowered to 60° C., and 36 kg of 1,3-butadiene was added at once to anionically polymerize 1,3-butadiene. The internal temperature rose to 86° C.

(6) After 1,3-butadiene was completely consumed, the internal temperature of the reaction system was lowered to 70° C., and 4 kg of styrene was added to anionically polymerize styrene. The internal temperature rose to 73° C.

(7) After styrene was completely consumed, finally, all polymerization active terminals were deactivated with water to obtain a polymerization solution including a block copolymer having a polystyrene block, a polybutadiene block, and a random block of styrene and butadiene.

(8) The polymerization solution was devolatilized and melt-pelletized with an extruder to obtain a block copolymer (B-1). An area ratio of the component having a molecular weight in terms of polystyrene of equal to or more than 400,000 with respect to all components was 0%, as determined from the GPC measurement.

Block Copolymer (B-2)

(1) 500.0 kg of cyclohexane and 75.0 g of tetrahydrofuran (THF) were placed in a reaction vessel.

(2) 2000 mL of a cyclohexane solution of 10% by mass of butyllithium as a polymerization initiator solution was added to the reaction vessel, and maintained at 30° C.

(3) 4 kg of styrene was added to anionically polymerize styrene. The internal temperature rose to 35° C.

(4) After styrene was completely consumed, the internal temperature of the reaction system was raised to 80° C., and while maintaining the internal temperature, a total amount of 156 kg of styrene and a total amount of 13 kg of 1,3-butadiene were added at the same time at constant addition rates of 156 kg/h and 13 kg/h, respectively.

(5) After styrene and 1,3-butadiene were completely consumed, the internal temperature of the reaction system was lowered to 60° C., and 23 kg of 1,3-butadiene was added at once to anionically polymerize 1,3-butadiene. The internal temperature rose to 71° C.

(6) After 1,3-butadiene was completely consumed, the internal temperature of the reaction system was lowered to 70° C., and 4 kg of styrene was added to anionically polymerize styrene. The internal temperature rose to 73° C.

(7) After styrene was completely consumed, finally, all polymerization active terminals were deactivated with water to obtain a polymerization solution including a block copolymer having a polystyrene block, a polybutadiene block, and a random block of styrene and butadiene.

(8) The polymerization solution was devolatilized and melt-pelletized with an extruder to obtain a block copolymer (B-2). An area ratio of the component having a molecular weight in terms of polystyrene of equal to or more than 400,000 with respect to all components was 0%, as determined from the GPC measurement.

Block Copolymer (B-3)

(1) 500.0 kg of cyclohexane and 75.0 g of tetrahydrofuran (THF) were placed in a reaction vessel.

(2) 2000 mL of a cyclohexane solution of 10% by mass of n-butyllithium as a polymerization initiator solution was added to the reaction vessel, and maintained at 30° C.

(3) 4 kg of styrene was added to anionically polymerize styrene. The internal temperature rose to 35° C.

(4) After styrene was completely consumed, the internal temperature of the reaction system was raised to 80° C., and while maintaining the internal temperature, a total amount of 132 kg of styrene and a total amount of 11 kg of 1,3-butadiene were added at the same time at constant addition rates of 132 kg/h and 11 kg/h, respectively.

(5) After styrene and 1,3-butadiene were completely consumed, the internal temperature of the reaction system was lowered to 60° C., and 49 kg of 1,3-butadiene was added at once to anionically polymerize 1,3-butadiene. The internal temperature rose to 95° C.

(6) After 1,3-butadiene was completely consumed, the internal temperature of the reaction system was lowered to 70° C., and 4 kg of styrene was added to anionically polymerize styrene. The internal temperature rose to 73° C.

(7) After styrene was completely consumed, finally, all polymerization active terminals were deactivated with water to obtain a polymerization solution including a block copolymer having a polystyrene block, a polybutadiene block, and a random block of styrene and butadiene.

(8) The polymerization solution was devolatilized and melt-pelletized with an extruder to obtain a block copolymer (B-3). An area ratio of the component having a molecular weight in terms of polystyrene of equal to or more than 400,000 with respect to all components was 0%, as determined from the GPC measurement.

Block Copolymer (B-4)

(1) 500.0 kg of cyclohexane and 75.0 g of tetrahydrofuran (THF) were placed in a reaction vessel.

(2) 2000 mL of a cyclohexane solution of 10% by mass of n-butyllithium as a polymerization initiator solution was added to the reaction vessel, and maintained at 30° C.

(3) 4 kg of styrene was added to anionically polymerize styrene. The internal temperature rose to 35° C.

(4) After styrene was completely consumed, the internal temperature of the reaction system was raised to 80° C., and while maintaining the internal temperature, a total amount of 144 kg of styrene and a total amount of 21 kg of 1,3-butadiene were added at the same time at constant addition rates of 144 kg/h and 21 kg/h, respectively.

(5) After styrene and 1,3-butadiene were completely consumed, the internal temperature of the reaction system was lowered to 60° C., and 27 kg of 1,3-butadiene was added at once to anionically polymerize 1,3-butadiene. The internal temperature rose to 76° C.

(6) After 1,3-butadiene was completely consumed, the internal temperature of the reaction system was lowered to 70° C., and 4 kg of styrene was added to anionically polymerize styrene. The internal temperature rose to 73° C.

(7) After styrene was completely consumed, finally, all polymerization active terminals were deactivated with water to obtain a polymerization solution including a block copolymer having a polystyrene block, a polybutadiene block, and a random block of styrene and butadiene.

(8) The polymerization solution was devolatilized and melt-pelletized with an extruder to obtain a block copolymer (B-4). An area ratio of the component having a molecular weight in terms of polystyrene of equal to or more than 400,000 with respect to all components was 0%, as determined from the GPC measurement.

Block Copolymer (B-5)

(1) 500.0 kg of cyclohexane and 75.0 g of tetrahydrofuran (THF) were placed in a reaction vessel.

(2) 2000 mL of a cyclohexane solution of 10% by mass of n-butyllithium as a polymerization initiator solution was added to the reaction vessel, and maintained at 30° C.

(3) 76 kg of styrene was added to anionically polymerize styrene. The internal temperature rose to 68° C.

(4) After styrene was completely consumed, the internal temperature of the reaction system was raised to 80° C., and while maintaining the internal temperature, a total amount of 72 kg of styrene and a total amount of 4 kg of 1,3-butadiene were added at the same time at constant addition rates of 144 kg/h and 8 kg/h, respectively.

(5) After styrene and 1,3-butadiene were completely consumed, the internal temperature of the reaction system was lowered to 60° C., and 44 kg of 1,3-butadiene was added at once to anionically polymerize 1,3-butadiene. The internal temperature rose to 92° C.

(6) After 1,3-butadiene was completely consumed, the internal temperature of the reaction system was lowered to 70° C., and 4 kg of styrene was added to anionically polymerize styrene. The internal temperature rose to 73° C.

(7) After styrene was completely consumed, finally, all polymerization active terminals were deactivated with water to obtain a polymerization solution including a block copolymer having a polystyrene block, a polybutadiene block, and a random block of styrene and butadiene.

(8) The polymerization solution was devolatilized and melt-pelletized with an extruder to obtain a block copolymer (B-5). An area ratio of the component having a molecular weight in terms of polystyrene of equal to or more than 400,000 with respect to all components was 0%, as determined from the GPC measurement.

Production of Resin Composition

The block copolymer (A-1) and the block copolymer (B-1) were mixed at a mass ratio of 33:67 and melt-pelletized by an extruder to produce the resin composition of Example 1. A styrene ratio and a 1,3-butadiene ratio in the obtained resin composition were determined by the following equation.

Styrene ratio (% by mass)=Σ[{charge ratio (% by mass) of styrene in the production of each block copolymer}×{blending ratio (% by mass) of the block copolymer in the resin composition}/100]

1,3-butadiene ratio (% by mass)=Σ[{charge ratio (% by mass) of 1,3-butadiene in the production of each block copolymer}×{blending ratio (% by mass) of the block copolymer in the resin composition}/100]

The resin compositions of Examples 2 to 6 and Comparative Examples 1 to 4 were produced in the same manner as in Example 1, except that the type and the mass ratio of the block copolymers were changed as shown in Table 1.

The resin composition of Comparative Example 4 was composed of only the block copolymer (A-2) having a coupling component. A composition (Example 8) having the styrene ratio and the production method in common with Comparative Example 4 except the coupling agent used, is described in paragraphs 0043 and 0044 of the specification of Japanese Patent Application Publication No. 7-97419.

Examples 1 to 6 and Comparative Examples 1 to 4

Using the resin compositions shown in Tables 1 and 2, first, a sheet having a thickness of 0.3 mm was extrusion-molded at a temperature of 200° C., stretched 1.2 times in MD by a longitudinal stretching machine, and then stretched 4.5 times in TD by a transverse stretching machine at a temperature shown in Tables 1 and 2 to prepare a heat-shrinkable film having an average thickness of 50 μm.

TABLE 1

| | | | | Example 1 | Example 2 | Example 3 | Example 4 | Example 5 | Example 6 | Example 7 |
|---|---|---|---|---|---|---|---|---|---|---|
| Block copolymer blending ratio | Center layer | A-1 | % by mass | 33 | 33 | 33 | 100 | 33 | 33 | 33 |
| | | B-1 | % by mass | 67 | — | — | — | 33 | 33 | 67 |
| | | B-2 | % by mass | — | 67 | — | — | — | — | — |
| | | B-3 | % by mass | — | — | 67 | — | — | — | — |
| | | B-4 | % by mass | — | — | — | — | 34 | — | — |
| | | B-5 | % by mass | — | — | — | — | — | 34 | — |
| | Surface and back layers | A-2 | % by mass | — | — | — | — | — | — | 100 |
| Composition of resin composition (center layer) | Styrene blending | | % by mass | 76 | 80 | 72 | 76 | 76 | 76 | 76 |
| | Butadiene blending | | % by mass | 24 | 20 | 28 | 24 | 24 | 24 | 24 |
| | Area ratio of Mw ≥ 400,000 | | % | 13 | 10 | 12 | 30 | 12 | 13 | 13 |

TABLE 1-continued

| | | | Example 1 | Example 2 | Example 3 | Example 4 | Example 5 | Example 6 | Example 7 |
|---|---|---|---|---|---|---|---|---|---|
| Physical properties of resin composition (center layer) | Tanδ peak temperature | °C. | 87 | 87 | 87 | 87 | 78 | 95 | 87 |
| | E" peak temperature | °C. | 70 | 70 | 70 | 70 | 62 | 77 | 70 |
| | Strain hardening degree | — | 2.9 | 3.3 | 2.4 | 5.0 | 2.3 | 4.2 | 2.9 |
| Film stretching temperature | | °C. | 95 (E" + 25) | 95 (E" + 25) | 95 (E" + 25) | 95 (E" + 25) | 85 (E" + 23) | 100 (E" + 23) | 95 (E" + 25) |
| Film physical properties | Heat shrinkage rate (70° C., 10 seconds) | % | 8 | 5 | 13 | 12 | 18 | 5 | 7 |
| | Heat shrinkage rate (100° C., 10 seconds) | % | 71 | 70 | 72 | 74 | 70 | 68 | 72 |
| | Natural shrinkage rate (40° C., 7 days) | % | 1.2 | 1.0 | 1.6 | 1.2 | 1.9 | 1.1 | 1.1 |
| | Tensile elongation | % | 350 | 270 | 360 | 390 | 320 | 340 | 320 |
| | Shrinkage stress (80° C.) | MPa | 1.5 | 1.5 | 1.5 | 1.9 | 1.3 | 1.6 | 1.7 |
| | Strain hardening degree | — | 3.1 | 3.6 | 2.7 | 5.5 | 2.6 | 4.7 | 3.3 |

TABLE 2

| | | | Comparative Example 1 | Comparative Example 2 | Comparative Example 3 | Comparative Example 4 |
|---|---|---|---|---|---|---|
| Block copolymer blending ratio | A-1 | % by mass | — | 33 | 33 | — |
| | A-2 | % by mass | — | — | — | 100 |
| | B-1 | % by mass | 100 | — | — | — |
| | B-4 | % by mass | — | 67 | — | — |
| | B-5 | % by mass | — | — | 67 | — |
| Composition of resin composition | Styrene blending | % by mass | 76 | 76 | 76 | 85 |
| | Butadiene blending | % by mass | 24 | 24 | 24 | 15 |
| | Area ratio of Mw ≥ 400,000 | % | 0 | 13 | 12 | 56 |
| Physical properties of resin composition | Tanδ peak temperature | °C. | 87 | 67 | 105 | 102 |
| | E" peak temperature | °C. | 70 | 54 | 83 | 78 |
| | Strain hardening degree | — | 1.7 | 1.6 | 5.1 | 5.5 |
| Film stretching temperature | | °C. | 95 (E" + 25) | 75 (E" + 21) | 105 (E" + 22) | 90 (E" + 12) |
| Film physical properties | Heat shrinkage rate (70° C., 10 seconds) | % | 4 | 40 | 1 | 8 |
| | Heat shrinkage rate (100° C., 10 seconds) | % | 63 | 72 | 67 | 73 |
| | Natural shrinkage rate (40° C., 7 days) | % | 1.2 | 14.3 | 0.9 | 2.2 |
| | Tensile elongation | % | 310 | 320 | 330 | 120 |
| | Shrinkage stress (80° C.) | MPa | 1.1 | 1.1 | 1.8 | 3.0 |
| | Strain hardening degree | — | 1.8 | 1.7 | 5.6 | 6.2 |

Example 7

Using the resin compositions shown in Table 1 as a center layer, the block copolymer (A-2) on both surfaces thereof (surface layer and back layer) was extrusion-molded into a sheet having a thickness of 0.3 mm with a T die having a feed block or a multi-manifold so as to have a layer ratio of 1/8/1 (surface layer/center layer/back layer), stretched 1.2 times in MD by a longitudinal stretching machine, and thereafter, the sheet was stretched 4.5 times in TD at a temperature shown in Table 1 by a transverse stretching machine to prepare a heat-shrinkable multilayer film having an average thickness of 50 μm.

The loss modulus (E"), the loss tangent value (tan δ), the strain hardening degree, and the film physical properties of the resin composition were measured according to the following methods.

Measurement of Loss Modulus and Loss Tangent Value

The loss modulus (E") and the loss tangent value (tan δ) of the resin composition were measured by a dynamic viscoelasticity method according to the following procedure. tan δ satisfied a pass level when the temperature at which the main peak was shown was in a range of equal to or more than 70° C. and equal to or less than 100° C.

(1) A molded article having a thickness of 4 mm and a width of 10 mm was prepared by injection molding using a pellet of each resin composition, and a specimen having an appropriate size was cut out from the molded article and stored in a room at 23° C. and 50% RH for 48 hours to perform a curing treatment.

(2) A dynamic viscoelasticity measuring device RSA3 manufactured by TA Instruments was used to measure a storage modulus (E') and a loss modulus (E") in a temperature range from room temperature to 120° C. at a temperature rising rate of 4° C./min and a measurement frequency of 1 Hz, and tan δ in the temperature range was calculated by the following equation.

$$\tan \delta = E''/E'$$

Measurement of Strain Hardening Degree of Resin Composition

The strain hardening degree (λ max) of the resin composition was measured by the following method. See FIG. 1 for an example of a graph used to calculate the strain hardening degree (λ max). λ max satisfied a pass level when it is equal to or more than 2.0.

(1) A molded article having a thickness of 0.6 mm was prepared by compression molding using a pellet of each resin composition, and a specimen having a width of 10 mm was cut out from the molded article and stored in an environment of 60° C. for 48 hours to perform a curing treatment.

(2) An extensional viscosity measuring device DHR-2 manufactured by TA instruments was used to measure the extensional viscosity (η) at a strain rate of 0.1 sec$^{-1}$ and a temperature of 100° C.

(3) A graph with a common logarithm Log (ε) of a Hencky strain (ε) on the horizontal axis and a common logarithm Log (η) of η on the vertical axis was created and a linear approximation formula in a linear region in which ε=equal to or more than 0.1 and equal to or less than 0.3 was determined.

(4) When the Hencky strain at a point where η showed a peak is εp, a measured value of the extensional viscosity at ε=εp was ηp, and a calculated value at ε=εp of the above linear approximation formula was ηp*, a strain hardening degree (λ max) was calculated by the following equation.

$$\lambda \max = \eta p / \eta p^*$$

Measurement of Strain Hardening Degree of Film

The strain hardening degree (λ max) of the heat-shrinkable film or the heat-shrinkable multilayer film was measured by the following method. See FIG. 1 for an example of a graph used to calculate the strain hardening degree (λ max). λ max satisfied a pass level when it is equal to or more than 2.0.

(1) A film piece having an MD width of 100 mm and a TD width of 100 mm was cut out from the heat-shrinkable film or the heat-shrinkable multilayer film, and immersed in hot water at 100° C. for 3 minutes for heat treatment.

(2) A specimen having a TD width of 10 mm was cut out from the film piece after the heat treatment, and an extensional viscosity measuring device DHR-2 manufactured by TA Instruments was used to measure the extensional viscosity (η) at a strain rate of 0.1 sec$^{-1}$ and a temperature of 100° C.

(3) A graph with a common logarithm Log (ε) of a Hencky strain (ε) on the horizontal axis and a common logarithm Log (η) of η on the vertical axis was created and a linear approximation formula in a linear region in which ε=equal to or more than 0.1 and equal to or less than 0.3 was determined.

(4) When the Hencky strain at a point where η showed a peak was εp, a measured value of the extensional viscosity at ε=εp was ηp, and a calculated value at ε=εp of the above linear approximation formula was ηp*, a strain hardening degree (λ max) was calculated by the following equation.

$$\lambda \max = \eta p / \eta p^*$$

Measurement of Heat Shrinkage Rate

The heat shrinkage rate was measured by the following method. The heat shrinkage rate satisfied a pass level when it is equal to or more than 5% for 70° C. and equal to or more than 65% for 100° C.

(1) A specimen having an MD width of 100 mm and a TD width of 100 mm was cut out from the heat-shrinkable film or the heat-shrinkable multilayer film.

(2) The specimen was completely immersed in hot water at 70° C. or 100° C. for 10 seconds and then taken out, moisture was sufficiently wiped off, and a length L (mm) in TD was measured.

(3) The heat shrinkage rate was calculated by the following equation.

$$\text{Heat shrinkage rate (\%)} = \{(100-L)/100\} \times 100$$

Measurement of Tensile Elongation

The tensile elongation was measured by the following method. The tensile elongation satisfied a pass level when it is equal to or more than 200%.

(1) A strip-shaped specimen having an MD width of 200 mm and a TD width of 10 mm was cut out from the heat-shrinkable film or the heat-shrinkable multilayer film.

(2) Using a Tensilon universal material testing machine manufactured by ORIENTEC Co., Ltd., the cut specimen was given tension in MD at a tensile speed of 200 mm/min at a measurement temperature of 23° C. to measure the tensile elongation.

Measurement of Natural Shrinkage Rate

The natural shrinkage rate was measured by the following method. The natural shrinkage rate satisfied a pass level when it is equal to or less than 2%.

(1) A specimen having an MD width of 100 mm and a TD width of 350 mm was cut out from the heat-shrinkable film or the heat-shrinkable multilayer film.

(2) A marked line was put on the center of the specimen so that a TD mark interval was 300 mm, the specimen was stored in an environmental test machine at 40° C., and the mark interval N (mm) after storage for 7 days was measured.

(3) The natural shrinkage rate was measured by the following equation.

$$\text{Natural shrinkage rate (\%)} = \{(300-N)/300\} \times 100$$

Measurement of Maximum Value of Shrinkage Stress

The maximum value of the shrinkage stress was measured by the following method. The maximum value of the shrinkage stress satisfied a pass level when it is equal to or more than 0.8 MPa and equal to or less than 2.2 MPa.

(1) A specimen having an MD width of 15 mm and a TD width of 200 mm was cut out from the heat-shrinkable film or the heat-shrinkable multilayer film.

(2) Using a heat shrinkage stress measuring machine manufactured by TESTER SANGYO CO., LTD., the shrinkage stress when the cut specimen was heat-shrunk at a measurement temperature of 80° C. was measured for 40 seconds, and the maximum value of the shrinkage stress during that time was measured.

INDUSTRIAL APPLICABILITY

The heat-shrinkable film or the heat-shrinkable multilayer film using the resin composition of the present invention has excellent natural shrink resistance, shrinkage properties, and break resistance, and can be used for a label of PET bottles or the like.

The present application claims a priority based on Japanese Patent Application No. 2017-197355 filed on Oct. 11, 2017, and the entire disclosure thereof is incorporated herein.

The invention claimed is:

1. A resin composition comprising a block copolymer comprising:
   a vinyl aromatic hydrocarbon-derived structural unit; and
   a conjugated diene-derived structural unit derived from one or more conjugated diene selected from the group selected from 1,3-butadiene, 2,3-dimethyl-1,3-butadiene, 1,3-pentadiene, and 1,3-hexadiene, the conjugated diene-derived structural unit being unhydrogenated, the resin composition satisfying the following (1) to (4);
   (1) an area ratio of components having a weight average molecular weight (Mw) in terms of polystyrene of equal to or more than 400,000 with respect to all components, in a GPC measurement, is equal to or more than 8% and equal to or less than 50%;
   (2) at least one main peak of a loss tangent value (tan δ) measured under a condition of a frequency of 1 Hz at a temperature rising rate of 4° C./min in accordance with ISO 6721-1, in a dynamic viscoelasticity measurement, is present in a range of equal to or more than 70° C. and equal to or less than 100° C.;
   (3) a strain hardening degree (λ max) of a compression-molded specimen prepared in accordance with ISO 293, measured under a condition of a temperature of 100° C. at a strain rate of 0.1 $sec^{-1}$, in an extensional viscosity measurement, is equal to or more than 2.0; and
   (4) E″ peak temperature of the resin composition is equal to or less than 77° C.

2. The resin composition according to claim 1, wherein when a sum of the vinyl aromatic hydrocarbon-derived structural unit and the conjugated diene-derived structural unit is 100% by mass, a content of the vinyl aromatic hydrocarbon monomer unit is equal to or more than 70% by mass and equal to or less than 84% by mass.

3. A heat-shrinkable film comprising at least one layer of the resin composition according to claim 1.

4. The heat-shrinkable film according to claim 3, comprising a block copolymer comprising a vinyl aromatic hydrocarbon-derived structural unit and a conjugated diene-derived structural unit as a main component, the heat-shrinkable film satisfying the following (a) to (c):
   (a) at least one main peak of a loss tangent value (tan δ) of a specimen immersed in hot water at 100° C. for 3 minutes, measured in a direction perpendicular to a stretching direction under a condition of a frequency of 1 Hz at a temperature rising rate of 4° C./min in accordance with ISO 6721-1, in a dynamic viscoelasticity measurement, is present in a range of equal to or more than 70° C. and equal to or less than 100° C.;
   (b) a strain hardening degree (λ max) of a specimen immersed in hot water at 100° C. for 3 minutes, measured in a direction perpendicular to a stretching direction under a condition of a temperature of 100° C. at a strain rate of 0.1 $sec^{-1}$, in an extensional viscosity measurement, is equal to or more than 2.0; and
   (c) a maximum value of a shrinkage stress measured at 80° C. is equal to or more than 0.8 MPa and equal to or less than 2.2 MPa.

5. The heat-shrinkable film according to claim 4, wherein a natural shrinkage rate is equal to or less than 2% at 40° C. for 7 days.

6. The heat-shrinkable film according to claim 4, wherein a heat shrinkage rate is equal to or more than 5% at 70° C. for 10 seconds and equal to or more than 65% at 100° C. for 10 seconds.

7. The heat-shrinkable film according to claim 4, wherein a tensile elongation in a direction perpendicular to a stretching direction is equal to or more than 200% and equal to or less than 600%.

8. A container with the heat-shrinkable film according to claim 4 mounted on the container.

9. The resin composition according to claim 1, wherein E″ peak temperature of the resin composition is from 18° C. to 77° C.

* * * * *